United States Patent
Cai

(10) Patent No.: US 11,849,907 B2
(45) Date of Patent: Dec. 26, 2023

(54) VACUUM CLEANER MOTOR DEVICE AND VACUUM CLEANER

(71) Applicant: Dongguan Fornice Intelligent Technology Co., Ltd., Guangdong (CN)

(72) Inventor: Zhan Cai, Dongguan (CN)

(73) Assignee: Fornice Intelligent Technology Co., Ltd.

( * ) Notice: Subject to any disclaimer, the term of this patent is extended or adjusted under 35 U.S.C. 154(b) by 751 days.

(21) Appl. No.: 16/982,018

(22) PCT Filed: Apr. 16, 2020

(86) PCT No.: PCT/CN2020/085135
§ 371 (c)(1),
(2) Date: Sep. 17, 2020

(87) PCT Pub. No.: WO2020/244314
PCT Pub. Date: Dec. 10, 2020

(65) Prior Publication Data
US 2023/0102447 A1    Mar. 30, 2023

(30) Foreign Application Priority Data
Jun. 3, 2019 (CN) .......................... 201920839422.6

(51) Int. Cl.
*A47L 9/22* (2006.01)
*A47L 9/28* (2006.01)
*H02K 7/08* (2006.01)
*H02K 1/16* (2006.01)

(52) U.S. Cl.
CPC .................................. *A47L 9/22* (2013.01);
*A47L 9/28* (2013.01); *H02K 1/165* (2013.01);
*H02K 7/088* (2013.01); *H02K 2211/03* (2013.01)

(58) Field of Classification Search
CPC .. A47L 9/22; A47L 9/28; H02K 1/165; H02K 7/088; H02K 2211/03; H02K 5/24; H02K 7/16; H02K 21/14; H02K 5/10; H02K 11/33; H02K 29/08; H02K 7/14; H02K 1/141; H02K 1/27; H02K 7/003; H02K 9/06
See application file for complete search history.

(56) References Cited

FOREIGN PATENT DOCUMENTS

CN            201355796        * 12/2009

* cited by examiner

*Primary Examiner* — David Redding

(57) ABSTRACT

A vacuum cleaner motor device comprises a motor assembly and an expansion assembly. The motor assembly further comprises a rotor, a stator, and a main shaft. The expansion assembly further comprises a first motor support, a second motor support, a fan blade member, a fan blade member support, a PCBA assembly, a first bearing, and a second bearing. The rotor is a neodymium iron boron magnet made of neodymium iron boron, which ensures that the motor has a strong output power such that the rotating speed of the motor reaches more than 100,000 rpm. The outer circumferential diameter of the fan blade member ranges from 35 to 40 mm. Compared with conventional vacuum cleaners, the fan blade member of the present disclosure has a larger size, which ensures a stronger vacuum suction force of the vacuum cleaner and achieves better cleaning effect.

8 Claims, 4 Drawing Sheets

VACUUM CLEANER MOTOR DEVICE AND VACUUM CLEANER

TECHNICAL FIELD

This disclosure generally relates to the technical field of household electrical appliances, and more particularly, to a vacuum cleaner motor device and a vacuum cleaner.

BACKGROUND

Hand-held vacuum cleaners have become increasingly popular due to the lightweight, high portability, and absence of power cords. These merits make the hand-held vacuum cleaners especially convenient for cleaning a large or small area. In the prior art, conventional hand-held vacuum cleaners are normally equipped with a cyclone separator, which is utilized to remove pollutants from air. The vacuum cleaner typically comprises a suction inlet, which faces downward and is arranged within a vacuum cleaner head or a floor tool. The motor device produces a vacuum suction force such that the waste is sucked into a separation device through the suction inlet. Presently, hand-held vacuum cleaners with motor devices having a rotation speed higher than 100,000 revolutions per minute (rpm) have not yet emerged on the market.

SUMMARY

The purpose of the present disclosure is to provide a vacuum cleaner motor device and a vacuum cleaner. According to the present disclosure, the rotation speed of the motor is higher than 100,000 rpm, the vacuum suction force is strong, and the cleaning effect of the vacuum cleaner is good.

To achieve the above purpose, the present disclosure adopts the following technical solution: a vacuum cleaner motor device comprising a motor assembly and an expansion assembly, wherein the motor assembly further comprises a rotor, a stator, and a main shaft, wherein the expansion assembly further comprises a first motor support, a second motor support, a fan blade member, a fan blade member support, a Printed Circuit Board Assembly (PCBA assembly), a first bearing and a second bearing, wherein the stator further comprises four U-shaped upper winding supports, four U-shaped lower winding supports and four motor silicon steel sheets, wherein the U-shaped openings of the four U-shaped upper winding supports and the U-shaped openings of the four U-shaped lower winding supports are oppositely arranged such that the motor silicon steel sheets are fixed between the four U-shaped upper winding supports and the four U-shaped lower winding supports, wherein the four U-shaped upper winding supports, the four U-shaped lower winding supports and the motor silicon steel sheets are fixed within a first motor support through bolts, wherein the main shaft penetrates through the stator and is sequentially provided with the first bearing, the rotor, the second bearing and a Hall magnet from top to bottom, wherein the rotor is arranged in the middle of the main shaft and is surrounded by the stator, wherein the second bearing is fixed with the lower portion of the first motor support, and the Hall magnet is fixed at the lower end of the main shaft, wherein the rotor is a neodymium iron boron magnet made of neodymium iron boron, wherein a fan blade member support is arranged above the first motor support, and the fan blade member is arranged at the top end of the main shaft penetrating through the fan blade member support, wherein the first bearing is fixedly arranged at the lower middle portion of the fan blade member support, wherein the outer circumferential diameter of the fan blade member is 35-40 millimeter (mm), wherein the lower portion of the first motor support is further provided with a connecting piece, and the connecting piece is fixedly connected with the PCBA assembly, wherein the PCBA assembly is provided with a buckling member, the second motor support is internally provided with a buckling position, and the second motor support is buckled with the PCBA assembly, wherein the second motor support covers the first motor support and the PCBA assembly from top to bottom such that the first motor support and the PCBA assembly are fixed within the second motor support.

In another aspect of the present disclosure, the outer circumference of the first bearing and the second bearing are respectively provided with a first bearing damping ring and a second bearing damping ring.

In another aspect of the present disclosure, the PCBA assembly comprises a PCBA, a PCBA support, a PCBA support sealing ring, a PCBA shock-proof gasket, and a Hall switch.

In another aspect of the present disclosure, a buckling member is arranged on the PCBA support, an annular groove is formed in the outer side of the circumference of the PCBA support, and the PCBA support sealing ring is embedded into the annular groove. The PCBA is arranged below the PCBA support, the annular PCBA shock-proof gasket is arranged between the PCBA support and the PCBA, and the Hall switch is arranged on the PCBA.

In another aspect of the present disclosure, the motor device further comprises a motor air duct and a motor air duct head. The second motor support is fixed on the motor air duct head by screws. The motor air duct covers the fan blade member support and the second motor support from top to bottom and is fixed on the motor air duct head by screws.

In another aspect of the present disclosure, an annular groove is formed in the outer side of the circumference of the upper portion of the fan blade member support. A fan blade member support sealing ring is embedded in the annular groove, and the fan blade member support sealing ring abuts against the inner wall of the upper portion of the motor air duct.

In another aspect of the present disclosure, a second motor support sealing ring is arranged between the second motor support and the motor air duct head.

In another aspect of the present disclosure, a motor air duct head sealing ring is arranged between the motor air duct and the motor air duct head.

The present disclosure also provides a vacuum cleaner, which comprises the aforesaid vacuum cleaner motor device.

Compared with the prior art, the present disclosure has the following advantages: the vacuum cleaner motor device of the present disclosure comprises a motor assembly and an expansion assembly; the motor assembly further comprises a rotor, a stator, and a main shaft; the expansion assembly further comprises a first motor support, a second motor support, a fan blade member, a fan blade member support, a PCBA assembly, a first bearing, and a second bearing; the rotor is a neodymium iron boron magnet made of neodymium iron boron, which ensures that the motor has a strong output power such that the rotating speed of the motor is higher than 100,000 rpm; the outer circumferential diameter of the fan blade member is 35-40 mm; compared with the fan blade member of conventional vacuum cleaners, the fan blade member of the present disclosure has a larger size, which ensures a stronger vacuum suction force of the vacuum cleaner and achieves better cleaning effect.

BRIEF DESCRIPTION OF THE DRAWINGS

To clearly explain the technical solutions in the embodiments of the present disclosure, the drawings needed in the description of the embodiments are briefly described hereinafter. Obviously, the drawings described hereinafter are only some embodiments of the present disclosure. Those skilled in the art may obtain other drawings based on the specification and drawings of the present disclosure without paying creative labor.

Figure 1:
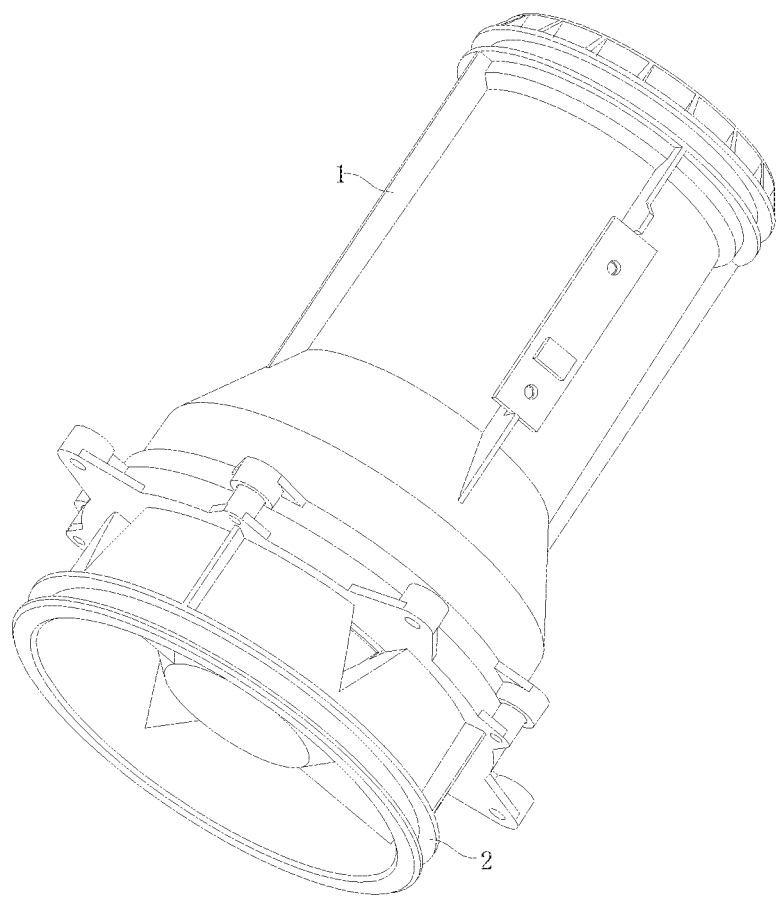
FIG. 1 is a conceptual diagram illustrating a three-dimensional structure of the vacuum cleaner motor device in embodiment 1 of the present disclosure.

In the Figures: 1—Motor Air Duct, 2—Motor Air Duct Head, 201—Motor Air Duct Head Sealing Ring, 3—Fan Blade Member Support, 301—Fan Blade Member, 302—Fan Blade Member Support Sealing Ring, 4—The Second Motor Support, 401—The Second Motor Support Sealing Ring, 5—The First Motor Support, 501—Stator, 501A—U-shaped Upper Winding Support, 501B—Motor Silicon Steel Sheet, 501C—U-shaped Lower Winding Support, 502—Connecting Piece, 503—Main Shaft, 504—Rotor, 505—The First Bearing, 506—The Second Bearing, 507—Hall Magnet, 6—PCBA Assembly, 601—PCBA, 602—PCBA Support, 603—PCBA Support Sealing Ring, 604—PCBA Shock-proof Gasket, 605—Hall Switch.

DETAILED DESCRIPTION

To make the technical problems solved, the technical solution adopted and the technical effect achieved more clearly, figures and embodiments are combined hereinafter to further elaborate the technical solution of the present disclosure. Obviously, the described embodiments are merely a part but not all of the embodiments of the present disclosure. Based on the embodiments of the present disclosure, other embodiments obtained by those skilled in the art without paying creative labor shall all fall into the scope of the present disclosure.

In the description of the present disclosure, unless it is clearly stated, the terms "connection" and "fixed" shall be understood in a broad sense. For instance, it may be a fixed connection, a detachable connection, a mechanical connection, an electrical connection, a direct connection, an indirect connection through an intermediate medium, an internal connection of two components, or an interaction between two components. For those skilled in the art, the specific meanings of the above terms in the present disclosure may be understood according to specific circumstances.

In the description of the present disclosure, unless it is clearly stated, the first feature being "above" or "below" the second feature may indicate that the first feature and the second feature are in direct contact or in indirect contact through other features between them. Moreover, the first feature being "above" the second feature may indicate that the first feature is directly above and obliquely above the second feature, or may simply indicate that the horizontal height of the first feature is higher than that of the second feature. The first feature being "below" the second feature may indicate that the first feature is directly below and obliquely below the second feature, or may simply indicate that the horizontal height of the first feature is lower than that of the second feature.

In the description of the present embodiment, the terms "upper", "lower", "left" and "right" and other position relations are based on the orientation or position relations shown in the figures, which are only for the convenience of description and simplification of operation rather than indicating or implying that the device or element referred to must have a specific orientation, be constructed or operated in a specific orientation. Thus, the aforesaid terms cannot be understood as a limitation of the present disclosure. In addition, the terms "first" and "second" are only used to distinguish between descriptions and have no special meaning.

Embodiment 1

Figure 2:
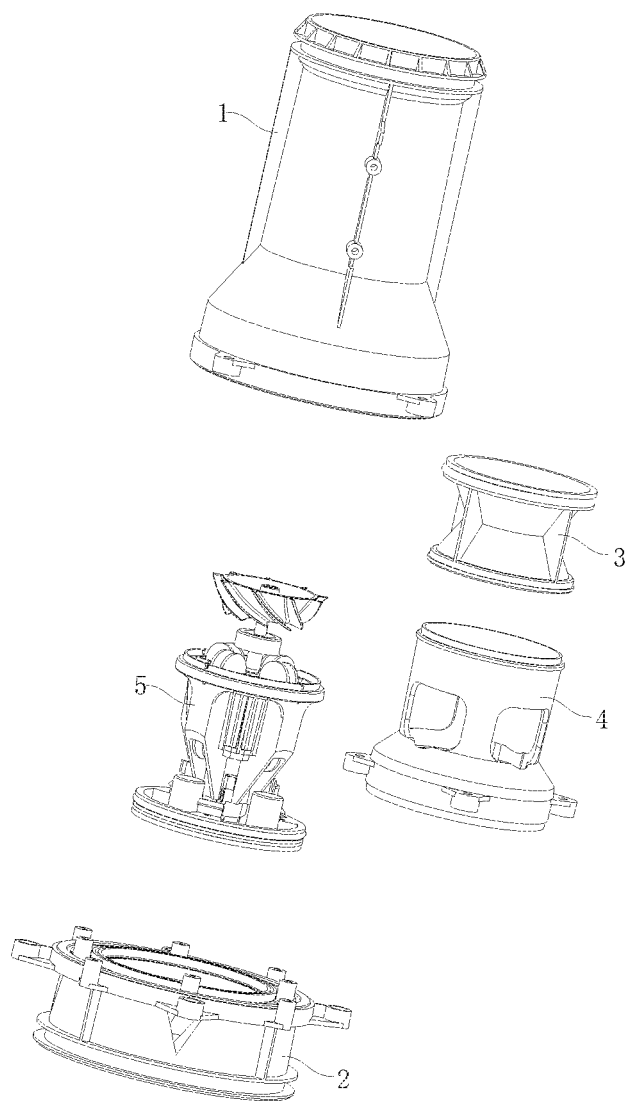
FIG. 2 is a conceptual diagram illustrating an explosive view of the vacuum cleaner motor device in embodiment 1 of the present disclosure.
Figure 3:
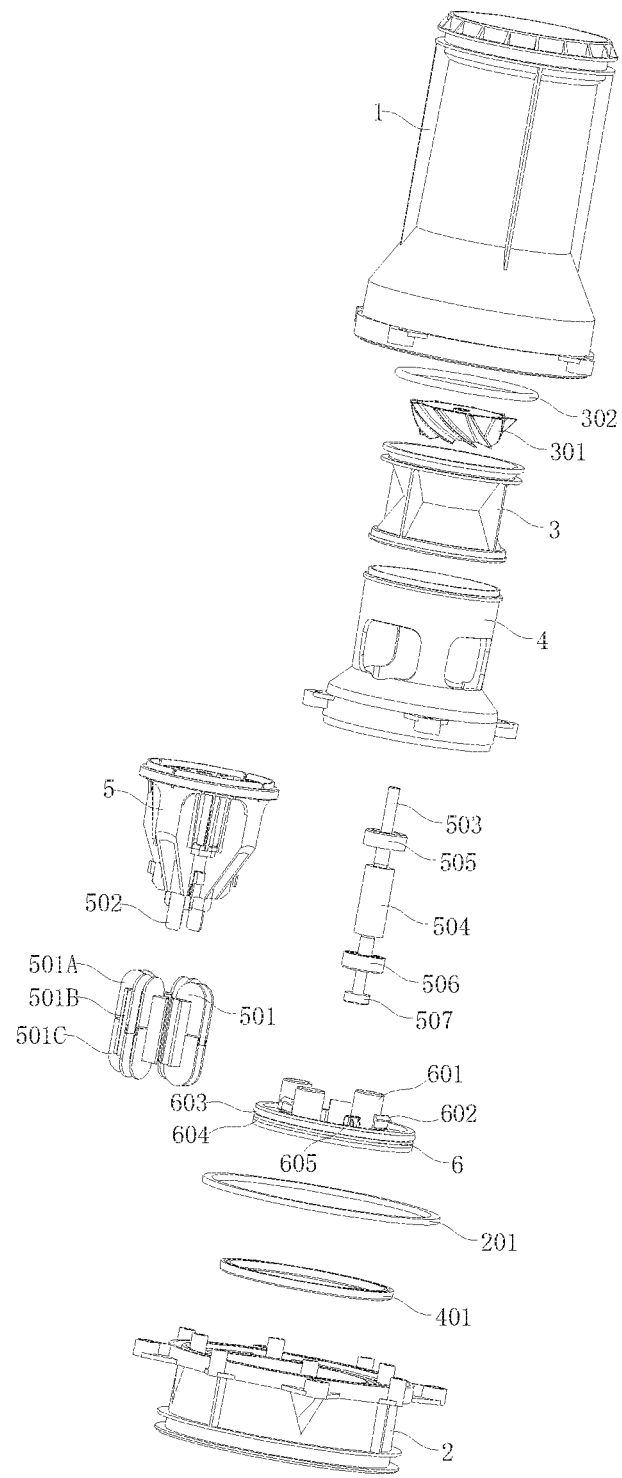
FIG. 3 is another conceptual diagram illustrating an explosive view of the vacuum cleaner motor device in embodiment 1 of the present disclosure.
Figure 4:
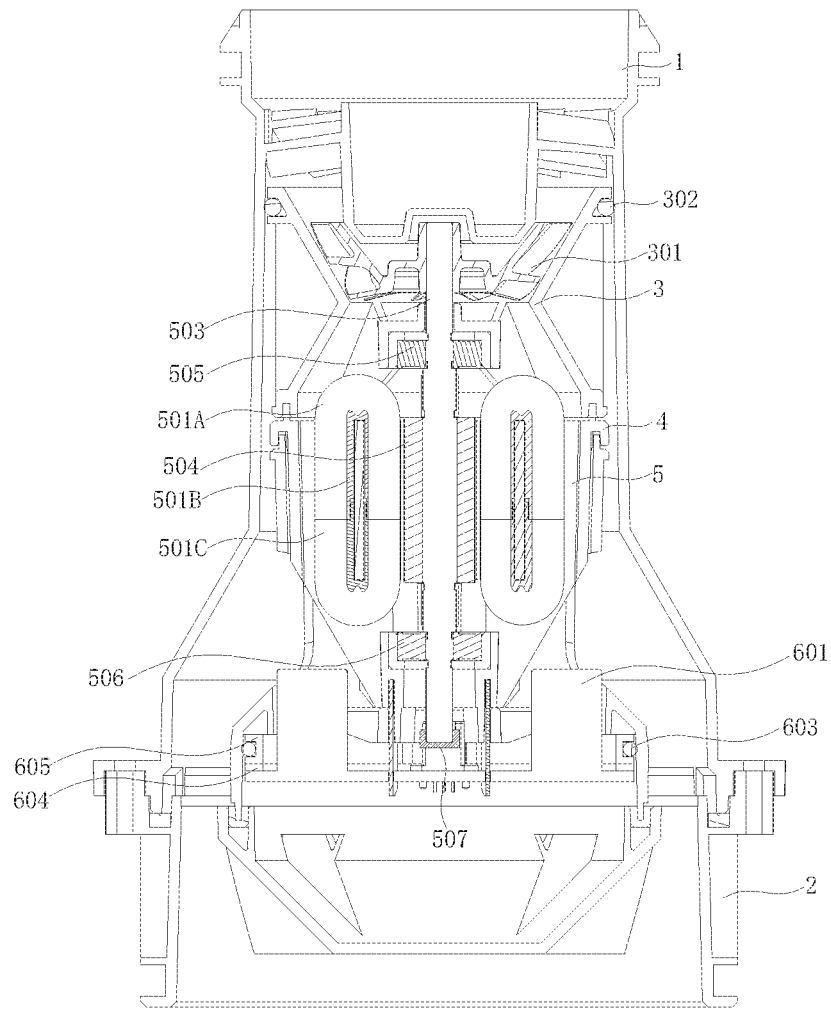
FIG. 4 is a conceptual diagram illustrating a sectional view of the vacuum cleaner motor device in embodiment 1 of the present disclosure.

As shown in FIGS. 1-4, the present disclosure provides a vacuum cleaner motor device whose motor's rotation speed is higher than 100,000 rpm, and vacuum suction force is strong.

The vacuum cleaner motor device comprises a motor assembly and an expansion assembly. The motor assembly further comprises a rotor 504, a stator 501, and a main shaft 503. The expansion assembly further comprises a first motor support 5, a second motor support 4, a fan blade member 301, a fan blade member support 3, a PCBA assembly 6, a first bearing 505, and a second bearing 506. The stator 501 further comprises four U-shaped upper winding supports 501A, four U-shaped lower winding supports 501C, and four motor silicon steel sheets 501B. The U-shaped openings of the four U-shaped upper winding supports 501A and the U-shaped openings of the four U-shaped lower winding supports 501C are oppositely arranged such that the motor silicon steel sheets 501B are fixed between the four U-shaped upper winding supports 501A and the four U-shaped lower winding supports 501C. The four U-shaped upper winding supports 501A, the four U-shaped lower winding supports 501C, and the motor silicon steel sheets 501B are fixed within the first motor support 5 through bolts.

More specifically, the first motor support 5 is configured to be a conical hollow structure. The coils are respectively wound on the four U-shaped upper winding supports 501A and the four U-shaped lower winding supports 501C. The four U-shaped upper winding supports 501A, the four U-shaped lower winding supports 501C, and the four motor silicon steel sheets 501B are arranged in a circle and fixed within the first motor support 5 through bolts.

The main shaft 503 penetrates through the stator 501 and is sequentially provided with the first bearing 505, the rotor 504, the second bearing 506, and a Hall magnet 507 from top to bottom. The rotor 504 is arranged in the middle of the main shaft 503 and is surrounded by the stator 501. The second bearing 506 is fixed with the lower portion of the first motor support 5, and the Hall magnet 507 is fixed at the lower end of the main shaft 503.

More specifically, the Hall magnet 507 is used to receive signals sent by a Hall switch 60, thereby controlling the rotation speed of the motor. As the Hall magnet 507 controlling the motor's rotation speed by receiving signals from the Hall switch 605 belongs to the prior art and, it is briefly described herein.

The rotor 504 is a neodymium iron boron magnet made of neodymium iron boron, which ensures that the motor has a strong output power such that the rotating speed of the motor is higher than 100,000 rpm.

A fan blade member support 3 is arranged above the first motor support 5, and the fan blade member 301 is arranged at the top end of the main shaft 503 penetrating through the fan blade member support 3. The first bearing 505 is fixedly arranged at the lower middle portion of the fan blade member support 3. The outer circumferential diameter of the fan blade member 301 is 35-40 mm.

More specifically, the middle portion of the fan blade member support 3 is provided with a hollow structure. When the main shaft 503 of the motor assembly rotates, the fan blade member 301 is propelled to rotate, thus providing a vacuum suction force. The fan blade member 301 having an outer circumferential diameter of 35-40 mm is capable of providing a strong vacuum suction force, wherein when the outer circumferential diameter of the fan blade member 301 is 37 mm, an ideal vacuum suction force is achieved.

The lower portion of the first motor support 5 is further provided with a connecting piece 502, and the connecting piece 502 is fixedly connected with the PCBA assembly 6. In this way, the two poles of the coils of the stator 501 may be connected to the PCBA assembly 6, and the rotating speed of the motor may be controlled by the PCBA assembly 6.

The PCBA assembly 6 is provided with a buckling member (not shown), the second motor support 4 is internally provided with a buckling position (not shown), and the second motor support 4 is buckled with the PCBA assembly 6. The second motor support 4 covers the first motor support 5 and the PCBA assembly 6 from top to bottom such that the first motor support 5 and the PCBA assembly 6 are fixed within the second motor support 4. A side of the second motor support 4 is provided with a hollow structure, which allows air to flow freely.

The outer circumference of the first bearing 505 and the second bearing 506 are respectively provided with a first bearing damping ring (not shown) and a second bearing damping ring (not shown). The first bearing damping ring and the second bearing damping ring may prevent the first bearing 505 and the second bearing 506 from slipping while achieving an ideal damping effect. In this way, the main shaft 503 becomes more stable when rotating.

The PCBA assembly 6 comprises a PCBA 601, a PCBA support 602, a PCBA support sealing ring 603, a PCBA shock-proof gasket 604, and a Hall switch 605.

A buckling member is arranged on the PCBA support 602, an annular groove (not shown) is formed in the outer side of the circumference of the PCBA support 602, and the PCBA support sealing ring 603 is embedded into the annular groove. The PCBA 601 is arranged below the PCBA support 602, the annular PCBA shock-proof gasket 604 is arranged between the PCBA support 602 and the PCBA 601, and the Hall switch 605 is arranged on the PCBA 601.

More specifically, the PCBA assembly 6 is buckled with the second motor support 4 through the buckling member arranged on the PCBA support 602. The PCBA support sealing ring 603 seals the gap between the PCBA assembly 6 and the second motor support 4 such that air leakage is prevented. The PCBA shock-proof gasket has functions of shock-proofing and stabilization. The PCBA 601 is provided with a Hall support (not shown), and the Hall switch 605 is fixed on the PCBA 601 through the Hall support.

The motor device further comprises a motor air duct 1 and a motor air duct head 2. The second motor support 4 is fixed on the motor air duct head 2 by screws. The motor air duct 1 covers the fan blade member support 3 and the second motor support 4 from top to bottom and is fixed on the motor air duct head 2 by screws.

More specifically, a plurality of impellers (not shown) are arranged at the top of the motor air duct 1, and a hollow structure is formed among the impellers. A plurality of impellers (not shown) are arranged at the bottom of the motor air duct head 2, and a hollow structure is formed among the impellers. Under the action of the motor's vacuum suction force, air flows in from the hollow structure formed among the impellers at the bottom of the motor air duct head 2, and then flows out from the hollow structure formed among the impellers at the top of the motor air duct 1.

To prevent air leakage from occurring at the place where the fan blade member support 3 abuts against the motor air duct 1, an annular groove (not shown) is formed in the outer side of the circumference of the upper portion of the fan blade member support 3. A fan blade member support sealing ring 302 is embedded in the annular groove, and the fan blade member support sealing ring 302 abuts against the inner wall of the upper portion of the motor air duct 1.

To prevent air leakage of the bottom of the second motor support 4, a second motor support sealing ring 401 is arranged between the second motor support 4 and the motor air duct head 2.

To prevent air leakage of the motor air duct head 2, a motor air duct head sealing ring 201 is arranged between the motor air duct 1 and the motor air duct head 2.

The vacuum cleaner motor device of the present disclosure comprises a motor assembly and an expansion assembly. The motor assembly further comprises a rotor, a stator, and a main shaft. The expansion assembly further comprises a first motor support, a second motor support, a fan blade member, a fan blade member support, a PCBA assembly, a first bearing, and a second bearing. The rotor is a neodymium iron boron magnet made of neodymium iron boron, which ensures that the motor has a strong output power such that the rotating speed of the motor is higher than 100,000 rpm. The outer circumferential diameter of the fan blade member is 35-40 mm. Compared with the fan blade member of conventional vacuum cleaners, the fan blade member of the present disclosure has a larger size, which ensures a stronger vacuum suction force of the vacuum cleaner and achieves better cleaning effect.

Embodiment 2

The present disclosure also provides a vacuum cleaner, which comprises the vacuum cleaner motor device described in embodiment 1. According to the vacuum cleaner of the present disclosure, the rotation speed of the motor reaches more than 100,000 rpm and the vacuum suction force becomes stronger, achieving better suction effect during use.

The above are merely preferred embodiments of the present disclosure, and the scope of the present disclosure is not limited to the embodiments described above. All technical solutions obtained under the idea of the present disclosure shall fall into the scope of the present disclosure. It should be noted that various improvements and modifications may be made by those skilled in the art without departing from the principles of the present disclosure.

Therefore, these improvements and modifications shall also fall into the scope of the present disclosure. The scope of the present disclosure is defined by the claims.

What is claimed is:

1. A vacuum cleaner motor device, comprising:
 a motor assembly, and
 an expansion assembly, wherein the motor assembly comprises:
 a rotor,
 a stator, and
 a main shaft, wherein the expansion assembly comprises:
 a first motor support,
 a second motor support,
 a fan blade member,
 a fan blade member support,
 a PCBA assembly,
 a first bearing, and
 a second bearing, wherein the stator comprises:
 four U-shaped upper winding supports,
 four U-shaped lower winding supports, and
 four motor silicon steel sheets, wherein U-shaped openings of the four U-shaped upper winding supports and U-shaped openings of the four U-shaped lower winding supports are oppositely arranged such that the four motor silicon steel sheets are fixed between the four U-shaped upper winding supports and the four U-shaped lower winding supports, wherein the four U-shaped upper winding supports, the four U-shaped lower winding supports and the four motor silicon steel sheets are fixed within a first motor support through bolts, wherein the main shaft penetrates through the stator and is sequentially provided with the first bearing, the rotor, the second bearing and a Hall magnet from top to bottom, wherein the rotor is arranged in the middle of the main shaft and is surrounded by the stator, wherein the second bearing is fixed with a lower portion of the first motor support, and the Hall magnet is fixed at a lower end of the main shaft, wherein the rotor is a neodymium iron boron magnet made of neodymium iron boron, wherein a fan blade member support is arranged above the first motor support, and the fan blade member is arranged at a top end of the main shaft penetrating through the fan blade member support, wherein the first bearing is fixedly arranged at a lower middle portion of the fan blade member support, wherein an outer circumferential diameter of the fan blade member ranges from 35 to 40 mm, wherein the lower portion of the first motor support is further provided with a connecting piece, and the connecting piece is fixedly connected with the PCBA assembly, wherein the PCBA assembly is provided with a buckling member, the second motor support is internally provided with a buckling position, and the second motor support is buckled with the PCBA assembly, wherein the second motor support covers the first motor support and the PCBA assembly from top to bottom such that the first motor support and the PCBA assembly are fixed within the second motor support.

2. The vacuum cleaner motor device of claim 1, wherein the outer circumference of the first bearing and the second bearing are respectively provided with a first bearing damping ring and a second bearing damping ring.

3. The vacuum cleaner motor device of claim 1, wherein the PCBA assembly comprises a PCBA, a PCBA support, a PCBA support sealing ring, a PCBA shock-proof gasket and a Hall switch, wherein a buckling member is arranged on the PCBA support, an annular groove is formed in the outer side of the circumference of the PCBA support, and the PCBA support sealing ring is embedded into the annular groove, wherein the PCBA is arranged below the PCBA support, the annular PCBA shock-proof gasket is arranged between the PCBA support and the PCBA, and the Hall switch is arranged on the PCBA.

4. The vacuum cleaner motor device of claim 1, wherein the motor device further comprises:
 a motor air duct, and
 a motor air duct head, wherein the second motor support is fixed on the motor air duct head by screws, wherein the motor air duct covers the fan blade member support and the second motor support from top to bottom and is fixed on the motor air duct head by screws.

5. The vacuum cleaner motor device of claim 4, wherein an annular groove is formed in the outer side of the circumference of the upper portion of the fan blade member support, wherein a fan blade member support sealing ring is embedded in the annular groove, and the fan blade member support sealing ring abuts against the inner wall of the upper portion of the motor air duct.

6. The vacuum cleaner motor device of claim 4, wherein a second motor support sealing ring is arranged between the second motor support and the motor air duct head.

7. The vacuum cleaner motor device of claim 4, wherein a motor air duct head sealing ring is arranged between the motor air duct and the motor air duct head.

8. A vacuum cleaner, wherein the vacuum cleaner comprises the vacuum cleaner motor device of claim 1.

* * * * *